(12) United States Patent
Zimmer et al.

(10) Patent No.: US 7,587,750 B2
(45) Date of Patent: Sep. 8, 2009

(54) METHOD AND SYSTEM TO SUPPORT NETWORK PORT AUTHENTICATION FROM OUT-OF-BAND FIRMWARE

(75) Inventors: Vincent J. Zimmer, Federal Way, WA (US); Rahul Khanna, Beaverton, OR (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 10/607,678

(22) Filed: Jun. 26, 2003

(65) Prior Publication Data

US 2004/0268140 A1  Dec. 30, 2004

(51) Int. Cl.
*H04L 9/32* (2006.01)
*G06F 15/16* (2006.01)

(52) U.S. Cl. .................................. 726/2; 726/3; 726/4
(58) Field of Classification Search ................. 713/2–8; 726/11–14, 21, 27, 2–4
See application file for complete search history.

(56) References Cited

U.S. PATENT DOCUMENTS

| | | | | |
|---|---|---|---|---|
| 6,035,405 | A * | 3/2000 | Gage et al. ..................... | 726/15 |
| 6,173,405 | B1 * | 1/2001 | Nagel .......................... | 726/21 |
| 6,300,863 | B1 * | 10/2001 | Cotichini et al. ............. | 340/5.8 |
| 6,615,264 | B1 * | 9/2003 | Stoltz et al. .................. | 709/227 |
| 6,968,420 | B1 * | 11/2005 | Giles et al. .................. | 711/103 |
| 7,103,641 | B2 * | 9/2006 | Brannock ..................... | 709/217 |
| 2002/0162026 | A1 * | 10/2002 | Neuman et al. ............. | 713/201 |
| 2003/0021283 | A1 * | 1/2003 | See et al. ..................... | 370/401 |
| 2004/0158735 | A1 * | 8/2004 | Roese ......................... | 713/200 |
| 2004/0250126 | A1 * | 12/2004 | Buer et al. ................... | 713/201 |
| 2006/0161784 | A1 * | 7/2006 | Hunter et al. ................ | 713/182 |

OTHER PUBLICATIONS

Port-Based Network Access Control (IEEE Std 802.1X-2001), Institute of Electrical and Electronics Engineers, http://standards.ieee.org/reading/ieee/std/lanman/802.1X-2001.pdf pp. 5, 6, 8, 11, 25, 28 and 29.*

Intelligent Platform Management Interface Specification, version 1.15 revision 1.1, Feb. 20, 2002 pp. 8, 9, 12, 13, 15, 19, 23, 27, 85, 107, 116, 118, 162, 325 and 362.*

(Continued)

*Primary Examiner*—Benjamin E Lanier
(74) *Attorney, Agent, or Firm*—Blakely, Sokoloff, Taylor & Zafman LLP

(57) ABSTRACT

Methods and systems for performing network port authentication without requiring any operating system (OS) complicity are disclosed. Under one method, port authentication instructions are loaded into a protected memory space during a pre-boot of a supplicant system. In response to a port authentication request, the supplicant system's processor is switched to a hidden execution mode and executes the port authentication instructions to authenticate a network port hosted by an authenticator system to which the supplicant system is linked. One authentication process employs an authentication server that authenticates the supplicant via one of various authentication schemes, including an access challenge. Port authentication may also be performed via an out-of-band base management controller that operates independently from an operating system running on the supplicant.

16 Claims, 5 Drawing Sheets

OTHER PUBLICATIONS

Trusted Computing Platform Alliance (TCPA) Main Specification Version 1.1b, Trusted Computing Group, Feb. 22, 2002 pp. 1, 6, 83, and 282.*

Blunk & Vollbrecht. "PPP Extensible Authentication Protocol (EAP)," RFC 2284, the Internet Society, Mar. 1998.*

Aboba & Simon. "PPP EAP TLS Authentication Protocol," RFC 2716, the Internet Society, Oct. 1999.*

Dobbelsteijn, Erik. "What about 802.1X? An overview of possibilities for safe access to fixed and wireless networks," SURFnet slide presentation, www.surfnet.nl/innovatie/wlan/802.1Xen.pdf, Amsterdam, Oct. 29, 2002.*

PC21100 (Safekeeper) LPC-Based TCPA-Compliant Security Controller, National Semiconductor product brief, revision 1.0, http://ortodoxism.ro/datasheets/nationalsemiconductor/PC21100.pdf, Feb. 2002.*

* cited by examiner

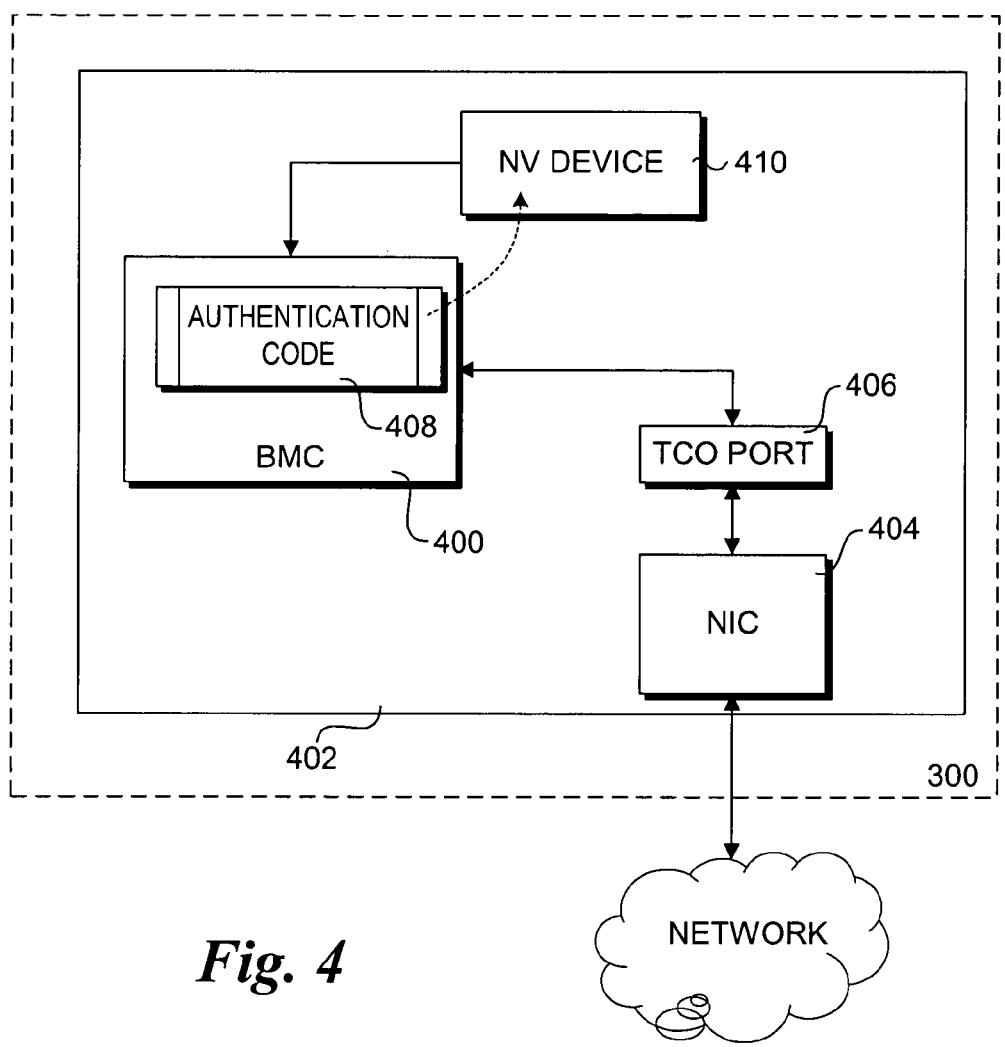
*Fig. 4*
*Fig. 5*
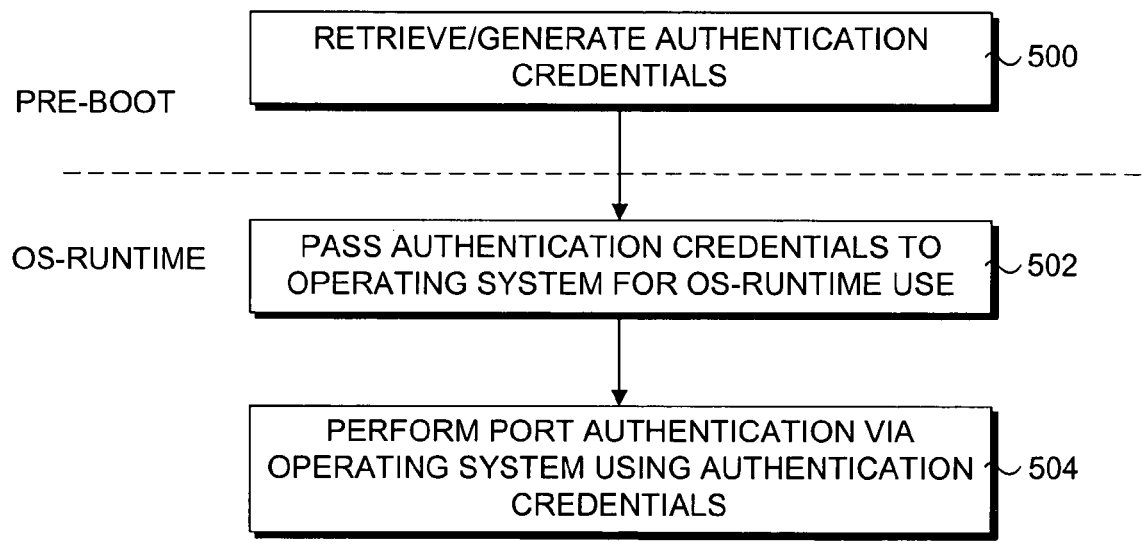

METHOD AND SYSTEM TO SUPPORT NETWORK PORT AUTHENTICATION FROM OUT-OF-BAND FIRMWARE

FIELD OF THE INVENTION

The field of invention relates generally to network security and, more specifically but not exclusively relates to a technique for performing network port authentication via out-of-band firmware.

BACKGROUND INFORMATION

IEEE (Instituted of Electronic and Electrical Engineers) 802 Local Area Networks (LANs) are often deployed in environments that permit unauthorized devices to be physically attached to the LAN infrastructure, or permit unauthorized users to attempt to access the LAN through equipment already attached. Examples of such environments include corporate LANs that provide LAN connectivity in areas of a building that are accessible to the general public, and LANs that are deployed by one organization in order to offer connectivity services to other organizations (for example, as may occur in a business park or a serviced office building). In such environments, it is desirable to restrict access to the services offered by the LAN to those users and devices that are permitted to make use of those services. Furthermore, unauthorized users may cause harm to components coupled to the LAN infrastructure, such as application and data servers.

In view of the foregoing LAN vulnerabilities, the IEEE promulgated a standard (IEEE 802.1x, approved Jun. 14, 2001) covering port-based network access control. Port-based network access control makes use of the physical access characteristics of IEEE 802 LAN infrastructures in order to provide a means of authenticating and authorizing devices attached to a LAN port that has point-to-point connection characteristics, and of preventing access to that port in cases in which the authentication and authorization process fails. A port in this context is a single point of attachment to the LAN infrastructure. Examples of ports in which the use of authentication can be desirable include the Ports of MAC Bridges (as specified in IEEE 802.1D), the ports used to attach servers or routers to the LAN infrastructure, and associations between stations and access points in IEEE 802.11 Wireless LANs.

Authenticated network access mechanisms in accordance with IEEE 802.1x have been implemented at the operating system (OS) level, such as for the Microsoft Windows XP operating system, LINUX operating systems, and various UNIX-based operating systems. However, this does not solve the security problem for computing platforms that run operating systems without built-in 802.1x support. Add-on drivers, which typically are employed to extend the capabilities of a shrink-wrapped OS, are generally limited for network access purposes without having corresponding network access support already designed into the OS. Furthermore, since OS-based network port security capabilities don't exist prior to operating system runtime, they are not available for operations such as network-based operating system loading.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 is a block schematic diagram illustrating an embodiment of the invention in which a base management controller is employed for port authentication;

FIG. 5 is a flowchart illustrating operations corresponding to a mixed authentication scheme in which firmware may be used for port authentication during pre-boot, while an operating system is employed for port authentication during OS-runtime.

DETAILED DESCRIPTION OF PREFERRED EMBODIMENTS

Figure 1:
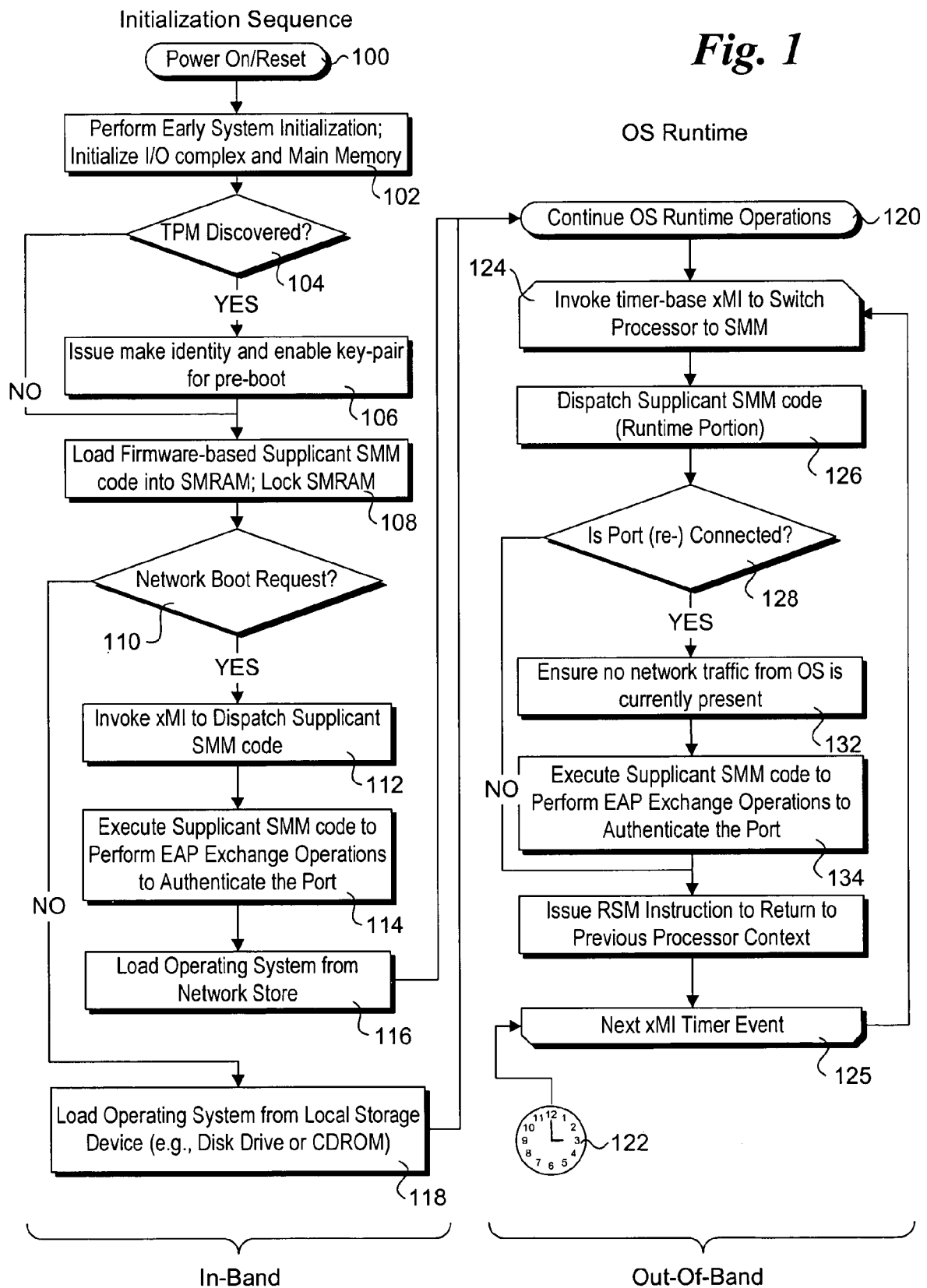
FIG. 1 is a flowchart illustrating operations and logic performed during a network port authentication process in accordance with one embodiment of the invention.

Embodiments of methods and apparatus and systems to support network port authentication from out-of-band firmware are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. An "Authenticator" is an entity at one end of a point-to-point LAN segment that facilitates authentication of the entity attached to the other end of the link. An "Authentication Server" is an entity that provides an authentication service to an authenticator. This service determines, from the credentials provided by the supplicant, whether the supplicant is authorized to access the services provided by the authenticator. A "Network Access Port" or simply "Port" is a point of attachment in a system to a LAN. It can be a physical port, for example, a single LAN MAC (Media Access Control) attached to a physical LAN segment, or a logical port, for example, an IEEE 802.11 association between a station and an access point.

A "Port Access Entity" (PAE) is the protocol entity associated with a Port. It can support the protocol functionality associated with the authenticator, the supplicant, or both. A "Supplicant" is an entity at one end of a point-to-point LAN segment that is being authenticated by an authenticator attached to the other end of that link. Under conventional point-to-point link terminology, a Supplicant is the equivalent to a "peer." A "System" is a device that is attached to a LAN by one or more ports. Examples of Systems include end stations (e.g., computer systems), servers, MAC Bridges, switches, and routers.

In addition to the foregoing terms, several acronyms and abbreviations are also used herein. These include EAP (extensible authentication protocol), EAPOL (EAP over LAN's), and RADIUS (remote authentication dial in user service).

In accordance with aspects of the invention, embodiments of firmware-based network port access schemes are disclosed that support network port authentication during the system pre-boot. Furthermore, firmware-based techniques are also disclosed for providing network port authentication during operating system runtime without requiring any OS complicity. Thus, systems employing the firmware components disclosed herein are enabled to support network port authentication even though they may run operating systems that do not inherently provide this support. This enables IT managers and the like to provide enhanced LAN security without requiring OS upgrades to the systems connected to the LAN infrastructure.

With reference to the flowchart of FIG. 1, initialization and operating system runtime operations corresponding to a firmware-based port authentication scheme in accordance with one embodiment proceed as follows. First, a system initialization sequence is performed in response to a power on or reset event depicted in a start block 100. In a block 102, early system initialization if performed by loading and executed portions of the system firmware. During this timeframe, the input/output (I/O) complex is initialized, along with the system's main memory.

In one embodiment, a Trusted Computing Platform Alliance (TCPA) security scheme is employed to obtain authentication credentials. In accordance with this embodiment, a trusted platform module (TPM) is searched for in the host system. For example, integrated circuits have been recently introduced to support TPM functionality, such as National Semiconductor's LPC-based TCPA-compliant security controller (Model number PC21100). Optionally, a software-based TPM may be employed. In a decision block 104, a determination is made to whether a TPM is discovered. If it is, a command to make identity and enable key-pair for the pre-boot environment is issued in a block 106; otherwise block 106 is skipped.

TCPA is an industry consortium concerned with platform and network security. The TCPA main specification, Version 1.1b, February, 2002 (http://www.trustedcomputing.org), is a plafform-independent industry specification that covers trust in computing platforms in general. TCPA implements a trusted platform subsystem that employs cryptographic methods when establishing trust. The trusted platform may be embodied as a device or devices, or may be integrated into some existing platform component or components. The trusted platform enables an authentication agent to determine the state of a platform environment and seal data particular to that platform environment. Subsequently, authentication data (e.g., integrity metrics) stored in a TPM may be returned in response to an authentication challenge to authenticate the platform.

A "trusted measurement root" measures certain platform characteristics, logs the measurement data, and stores the final result in a TPM (which contains the root of trust for storing and reporting integrity metrics. When an integrity challenge is received, the trusted platform agent gathers the following information: the final results from the TPM, the log of the measurement data from the trusted platform measurement store, and TCPA validation data that states the values that the measurements should produce in a platform that is working correctly. The operations of making an identity and enabling key-pair for the pre-boot environment enables TPM functionality to be employed for authentication purposes during and after pre-boot, such as discussed below with reference to FIG. 3.

Next, in a block 1008, firmware-based supplicant SMM (system management mode) code is loaded into SMRAM (system management RAM) and the SMRAM is looked. Further details of this operation are discussed below with reference to FIG. 2. Since the 386SL processor was introduced by the Intel® Corporation, SMM has been available on IA32 (Intel Architecture 32 bit) processors as an operation mode hidden to operating systems that executes code loaded by BIOS or firmware. SMM is a special-purpose operating mode provided for handling system-wide functions like power management, system hardware control, or proprietary OEM-designed code. The mode is deemed "hidden" because the operating system (OS) and software applications cannot see it, or even access it. IA32 processors are enabled to enter SMM via activation of an SMI (System Management Interrupt) signal. A similar signal called the PMI (Processor Management Interrupt) signal that is roughly analogous to the SMI signal is used for Itanium™-class processors. For simplicity, both SMI and PMI signals are sometimes referred to as xMI signals herein.

Additional firmware load and execution operations are performed to prepare the system for OS boot (not shown). Once the system is ready to boot an operating system, a determination is made in a decision block 110 to whether a network boot request is made. In brief, a network boot request corresponds to a situation in which the system is directed to boot from an operating system image that is stored on a network, rather than booting for a local OS image. If this is the case, a network port authentication to enable access to the network on which the network OS image is stored is performed.

This process begins in a block 112, wherein in xMI is invoked upon the system's processor. In response to the xMI, the processor stores its current context (i.e., information pertaining to current operations, including its current execution mode, stack and register information, etc.), and switches its execution mode to its system management mode. SMM handlers are then sequentially dispatched to determine if they are the appropriate handler for servicing the xMI event. This determination is made very early in the SMM handler code, such that there is little latency in determining which handler is appropriate. When this handler is identified, it is allowed to execute to completion to service the SMI event. Subsequent handlers may also be dispatched to provide related service functions. After the xMI event is serviced, an RSM (resume) instruction is issued to return the processor to its previous execution mode using the previously saved context data. The net result is that SMM operation is completely transparent to the operating system.

In this particular instance, the xMI event is invoked to perform network port authentication. Accordingly, in a block 114 supplicant SMM code, in the form of SMM handlers, is executed to perform EAP exchange operations to authenticate the port, as described below in further detail with reference to FIG. 3. Once authenticated, an operating system image is loaded from the network store in a block 116. In the event that a boot request is not made, the operating system is loaded in the normal manner from a local storage device, such as a disk drive with a boot partition (most common) or a CDROM drive. This completes the initialization sequence.

The operations and logic shown on the right-hand portion of FIG. 1 correspond to operations performed during operating system runtime. In accordance with aspects of the invention, a mechanism is provided to enable OS runtime port authentication in an OS agnostic manner. That is, the technique is effectuated without any operating system complicity, and, in fact, is performed in a manner transparent to the operating system. As a result, computer systems running operating systems that do not provide inherent support for port authentication are enabled to access secure network infrastructure.

In one embodiment, the mechanism is facilitated through use of the SMM mode in a manner similar to that discussed above during the pre-boot. However, since no OS complicity is to be involved, there needs to be a mechanism that kicks the processor into SMM. In one embodiment this is accomplished by employing a timer to generate periodic xMI assertions on the processor. In connection with the OS load, a timer 122 is setup to periodically assert xMI's.

In response to each timer-invoked xMI, the operations delineated by respective start and end loop blocks 124 and 125 are performed. First, in a block 126 an OS-runtime portion of the supplicant SMM code is dispatched to service the xMI. During execution of the supplicant SMM code, a determination is made in a decision block 128 to whether a new port connection has been established, or a port has been reconnected to another connection. If not, an RSM instruction is issued in a block 130 to return the processor to its previous execution context, and the processor returns to performing OS runtime operations until the next timer-invoked xMI occurs.

If the answer to decision block 128 is YES, operations in a block 132 are performed to ensure that there is no current network traffic present at the port. The reason for this is that the supplicant SMM code takes control of the port, and thus any OS-complicit network traffic will be lost once port control is handed off. Once it is determined that the network traffic on the port is clear, the Supplicant SMM code is executed to authenticate the port via the EAP exchange operations of FIG. 3 in a manner similar to block 114.

Figure 2:
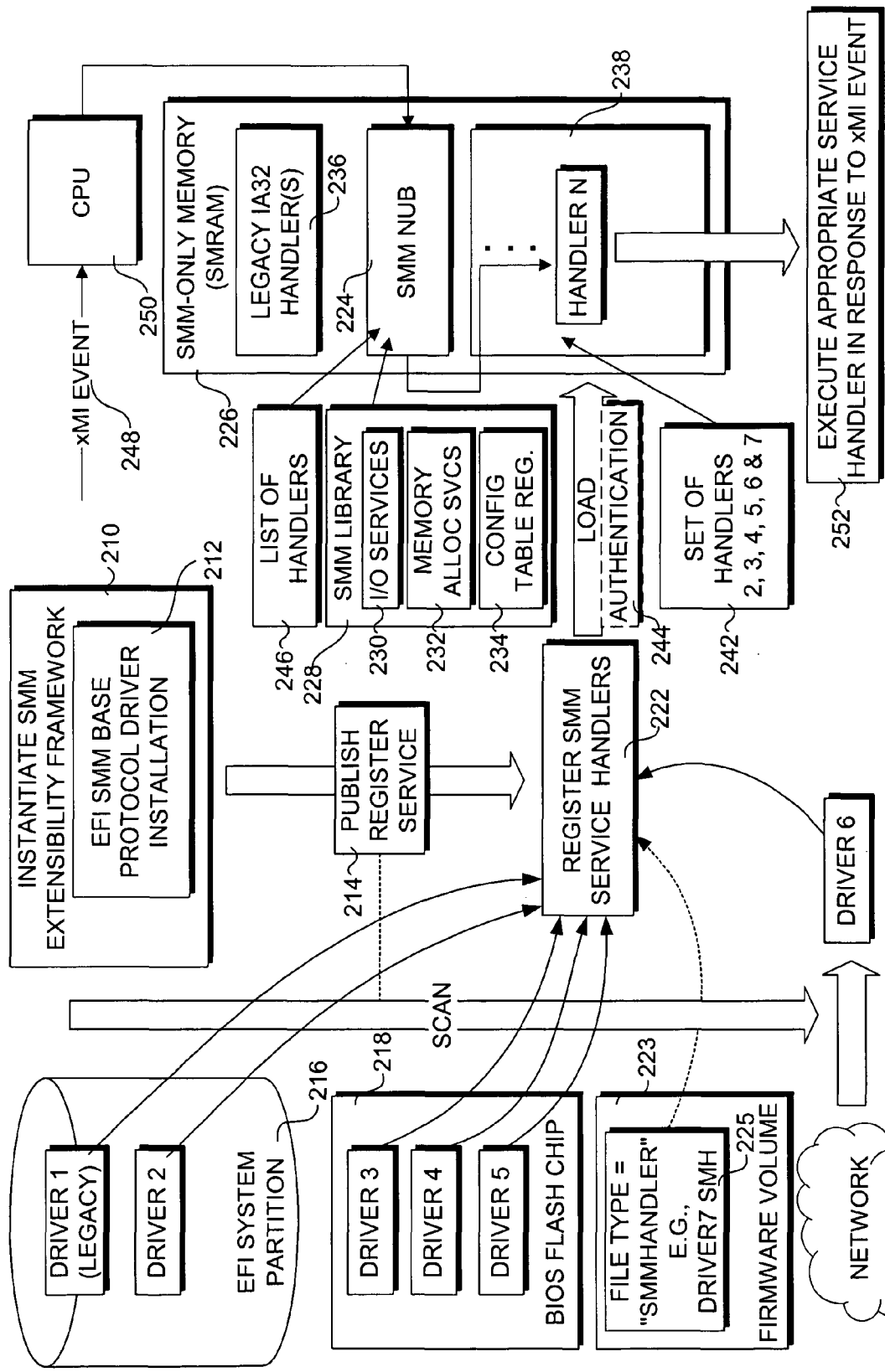
FIG. 2 is a is a schematic diagram illustrating a scheme for loading various event handlers into a hidden memory space and executing the handlers in response to a SMI or PMI (xMI) event.

As discussed above, firmware-based supplicant SMM code is loaded into SMRAM in block 108. An exemplary scheme for loading xMI event handlers and subsequent access mechanism is illustrated in FIG. 2. The scheme employs an agent that registers drivers that runs in the EFI (Extensible Firmware Interface) boot-services mode (i.e., the mode prior to operating system launch) and is composed of a CPU-specific component that binds the drivers and a platform component that abstracts chipset control of the xMI (PMI or SMI) signals. The API's (application program interfaces) providing these sets of functionality are referred to as the SMM Base and SMM Access Protocol, respectively.

In conventional SMM implementations, SMM space is often locked by the platform software/firmware/BIOS via hardware mechanisms before handing off control; this grants firmware the ability to abstract the control and security of this binding. In contrast, the software abstraction via the SMM Access protocol obviates the need of users of this facility to know and understand the exact hardware mechanism, thus allowing drivers to be portable across many platforms.

The access scheme of FIG. 2 includes the following features: a library in SMM for the drivers' usage, including an I/O access abstraction and memory allocation services; a means to communicate with drivers and applications executing in non-SMM mode; an optional parameter for periodic activation at a given frequency; a means to authenticate the drivers on load into SMM; the ability to close the registration capability; the ability to run in a multi-processor environment where many processors receive the xMI activation; and finally, the capability to run legacy IA32 SMM code as a distinguished registered event handler. A characteristic of the system is that all event handlers run in the native processor mode of Itanium™ or in the case of IA32, the framework will put the processor into flat 32 mode prior to invoking the event handlers, while running the optional legacy IA32 handler(s) in real-mode (i.e., 16-bit mode).

The implementation of the FIG. 2 load and access scheme is enabled through use of an extensible firmware framework known as Extensible Firmware Interface (EFI) (specifications and examples of which may be found at http://developer.intel.com/technology/efi). EFI is a public industry specification (current version 1.10 released Jan. 7, 2003) that describes an abstract programmatic interface between platform firmware and shrink-wrap operation systems or other custom application environments. The EFI framework include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks. The interface consists of data tables that contain plafform-related information, plus boot and runtime service calls that are available to the operating system and its loader. Together, these provide a standard environment for booting an operating system and running pre-boot applications.

The process for producing the SMM extensibility framework is initiated in a block 210, wherein The SMM extensibility framework is instantiated. This includes installing an EFI SMM base protocol driver in a block 212. The EFI SMM base protocol, SMM_BASE, is a CPU-specific protocol that is published by the CPU driver or another agency that can abstract the ISA-specific details of an IA32 or Itanium processor. Once installed, SMM_BASE publishes an SMM handler register service in a block 214. Publication of the handler register service enables legacy and add-on drivers that are stored on various storage devices, including an EFI system partition 216, a BIOS flash chip 218 and on a storage device accessed via a network 220 to register SMM event handlers in a block 222. In addition to these types of storage devices, the drivers may be stored on other persistent storage devices that are accessible to the computer system in which the invention is implemented, including motherboard-based ROMs, option-ROMs contained on add-on peripheral cards, local hard disks and CD ROMs, which are collectively depicted by a firmware volume 223. (It is noted that EFI system partition 216, BIOS flash chip 218 and the remote storage device on which driver 6 resides also may comprise firmware volumes.) As depicted in FIG. 2, these drivers include a legacy driver 1 and an add-on driver 2 stored in EFI system partition 216, add-on drivers 3, 4, and 5, which are stored on BIOS flash chip 218, and an add-on driver 6 that is accessed from a remote storage device (e.g., file server) via network 220. As used herein, the term "add-on" corresponds to drivers and firmware files that were not provided with the original firmware of the computer system as provided by the original equipment manufacture (OEM) of that system.

In an optional mode, the EFI SMM base protocol driver may scan various firmware volumes to identify any drivers that are designated for servicing xMI events via SMM. In one embodiment, these drivers are identified by their file type, such as exemplified by a "DRIVER7.SMH" file 225 corresponding to an add-on driver 7.

During the installation of the EFI SMM base protocol driver, an SMM Nub 224 is loaded into SMRAM 226, which comprises an SMM-only memory space. SMM Nub 224 is responsible for coordinating all activities while control is transferred to SMM, including providing an SMM library 228 to event handlers that includes PCI and I/O services 230, memory allocation services 232, and configuration table registration 234.

Registration of an SMM event handler is the first step in enabling the handler to perform a particular xMI event servicing function it is designed to perform. An SMM event handler comprises a set of code (i.e., coded machine instructions) that when executed by the system processor (CPU) performs an event service function in a manner similar to an interrupt service routine. Typically, each SMM event handler will contain code to service a particular hardware component or subsystem, or a particular class of hardware. In the context of the present invention, supplicant SMM handlers are employed for network port authentication operations. In general, there may be some correspondence between a given driver and an SMM event handler. However, this is not a strict requirement, as the handlers may comprise a set of functional blocks extracted from a single driver file or object.

When the event handler for legacy driver 1 is registered, it is loaded into SMRAM 226 as a legacy handler 236. A legacy handler is an event handler that is generally provided with the original system firmware and represents the conventional mechanism for handling an xMI event. As each add-on SMM event handler is registered in block 222, it is loaded into an add-on SMM event handler portion 238 of SMRAM 226; once all of add-on event handlers are loaded, add-on SMM event handler portion 228 comprises a set of event handlers corresponding to add-on drivers 2-7, as depicted by a block 242. In addition, as each SMM event handler is registered, it may optionally be authenticated in a block 244 to ensure that the event handler is valid for use with the particular processor and/or firmware for the computer system. For example, an encryption method that implements a public key may be used. As SMM event handlers are registered, they are added to a list of handlers 246 maintained by SMM Nub 224.

Once all of the legacy and add-on SMM event handlers have been registered and loaded into SMRAM 226 and proper configuration data (metadata) is written to SMM Nub 224, the SMRAM is locked, precluding registration of additional SMM event handlers. This system is now ready to handle various xMI events via SMM.

Ports of a System provides the means by which the system can access services offered by other systems reachable via a network (e.g., LAN), and provides the means by which the system can offer services to other systems reachable via the network. Port-based network access control allows the operations of a system's port(s) to be controlled in order to ensure that access to its services is only permitted by systems that are authorized to do so.

For the purpose of describing the operation of Port-based access control, a Port of a System (or more correctly, its Port Access Entity) is able to adopt one of two distinct roles within an access control interaction:

a) Authenticator: The Port that wishes to enforce authentication before allowing access to services that are accessible via that Port adopts the Authenticator role;

b) Supplicant: The Port that wishes to access the services offered by the Authenticator's system adopts the Supplicant role.

A further System role corresponds to c) Authentication Server: The Authentication Server performs the authentication function necessary to check the credentials of the Supplicant on behalf of the Authenticator and indicates whether the Supplicant is authorized to access the Authenticator's services.

Figure 3:
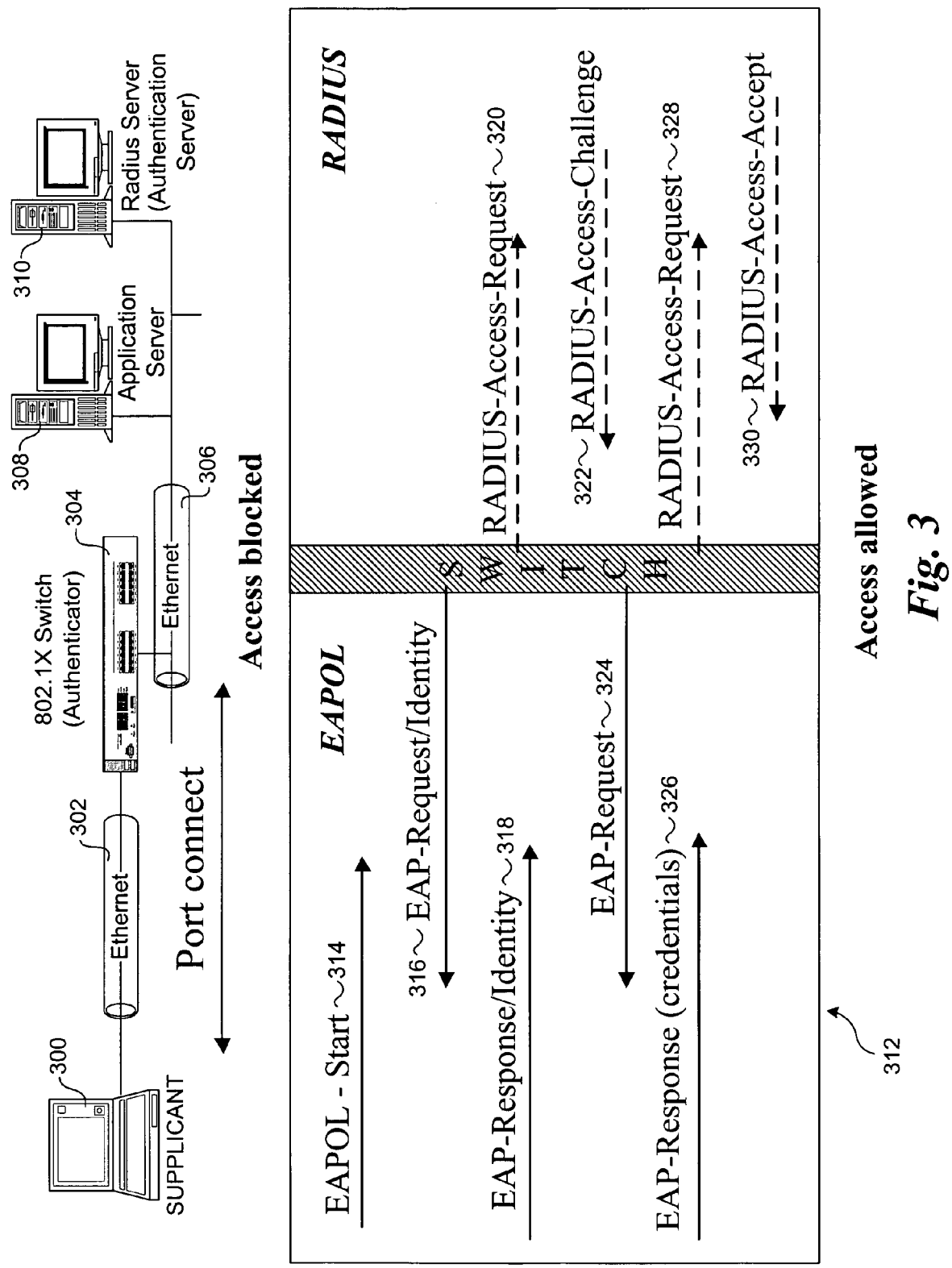
FIG. 3 is a schematic flow diagram illustrating an EAPOL-based authentication process in accordance with one embodiment of the invention.

A given system can be capable of adopting one or more of these roles; for example, an Authenticator and an Authentication Server can be collocated within the same System, allowing that System to perform the authentication function without the need for communication with an external server. However, the most common implementation will likely involve the use of an Authentication Server that is external to Systems that contain the Authenticators, such as shown in FIG. 3.

The Port Access Entity (PAE) operates the algorithms and protocols associated with the authentication mechanisms of a given System Port. In the Supplicant role, the PAE is responsible for responding to requests from an Authenticator for information that will establish its credentials. The PAE that performs the Supplicant roles in an authentication exchange is known as the Supplicant PAE. For simplicity and clarity, interactions described below with reference to FIG. 3 are discussed in terms of the communicating Systems rather than the PAEs of those systems.

Port Access Control provides an optional extension to the functionality of a System that offers a means of preventing unauthorized access by Supplicants to the services offered by that System. For example, if the System concerned is a MAC Bridge, control over access to the Bridge and the LAN to which it is connected can be desirable in order to restrict access to publicly accessible Bridge Ports, or within an organization, to restrict access to a departmental LAN to members of that department.

Access control is achieved by the System enforcing authentication of Supplicants that attach to the System's controlled Ports; from the result of the authentication process, the System can determine whether or not the Supplicant is authorized to access its services on that controlled Port. If the Supplicant is not authorized for access, the System sets the controlled Port state to unauthorized. In the unauthorized state, the use of the controlled Port is restricted in accordance with the value of the OperControlledDirections parameter associated with that controlled Port, preventing unauthorized data transfer between the Supplicant and the services offered by the System.

The IEEE 802.1x standard provides a protocol for communicating authentication information between a Supplicant, attached to a Port of an Authenticator System, and an Authentication Server, and for controlling the state of the Authenticator System's Port, depending on the outcome of the protocol exchange. This standard does not specify the nature of the authentication information that is exchanged, nor the basis upon which the Authentication Server makes its authentication decisions. Thus, one of many well-known authentication schemes may be deployed in conjunction with Port Authentication under IEEE 802.1x.

A Port Access Entity exists for each Port of a System that participates in Port-based access control. The PAE is able to operate in the role of a Supplicant or of an Authenticator or both. An Authenticator PAE is responsible for enforcing the authentication of a Supplicant PAE that attaches to its controlled Port and for controlling the authorization state of the controlled Port accordingly. In order to perform the authentication, the Authenticator PAE makes use of an Authentication Server. Communication between the Supplicant PAE and the Authenticator PAE, and between the Authenticator PAE and the Authentication Server (when the Authentication Server is not co-located with the Authenticator), is achieved by means of the protocols and procedures defined in IEEE 802.1x specification.

A Supplicant PAE is responsible for communicating the credentials of the Supplicant to the Authenticator PAE in response to requests from the Authenticator PAE. The Supplicant PAE may also initiate authentication exchanges and perform EAPOL-Logoff exchanges.

Authentication occurs primarily at System initialization time, or when a Supplicant System is connected to a Port of an Authenticator System. Until authentication has successfully completed, the Supplicant System only has access to the Authenticator System to perform authentication exchanges, or to access any services offered by the Authenticator's System that are not subject to the access control restrictions placed on the Authenticator's controlled Port. Once authentication has successfully completed, the Authenticator System allows full access to the services offered via the Authenticator System's controlled Port.

The operation of the authentication process makes use of the Extensible Authentication Protocol (EAP, specified in IETF RFC 2284) as the means for communicating authentication information between the Supplicant and the Authentication Server. EAP is a general protocol that supports multiple authentication mechanisms. For example, through the use of EAP, support for a number of authentication schemes may be added, including smart cards, Kerberos, Public Key Encryption, One Time Passwords, and others.

The Authenticator PAE controls the operational state of its controlled Port, but it does not interfere with the authentication exchanges between the Supplicant PAE and the Authentication Server. This separation between the Authenticator PAE and the authentication function permits the use of a backend Authentication Server that implements the various mechanisms needed to authenticate a Supplicant PAE. The Authenticator PAE simply controls the authorization state of its controlled Port based on the results of the authentication exchange. A full description of the authentication function can be found in IETF RFC 2869, and guidelines for the use of RADIUS in IEEE 802.1X can be found in Annex D of the IEEE Std 802.1X-2001 document.

FIG. 3 shows a network port authentication scheme that is implemented via authentication services provided by a RADIUS server in accordance with one embodiment. In the illustrated network infrastructure depicted at the top of FIG. 3, a Supplicant 300 is connected to an 802.1x switch 304 via an Ethernet cable 302. The 802.1x switch, functioning as an Authenticator, enables authorized systems coupled to the switch via a respective port to access network resources coupled to a secure subnet 306, such as an application server 308. Access to subnet 306 is managed by a RADIUS server 310, which comprises an Authentication Server. In effect, RADIUS server 310 interacts with 802.1x switch 304 to control access of systems external to secure subnet 306, such as supplicant 300, from accessing the secure subnet, by authenticating the switch ports to which those systems are connected.

Authentication can be initiated either by the Supplicant PAE or by the Authenticator PAE. The Supplicant-initiated port authentication process illustrated in FIG. 3 proceeds as follows. Initially, Supplicant 300 connects to subnet 302 an attempt is made by the supplicant to obtain network access to secure subnet 306 via 802.1x switch 304. Since the switch's network port to which Supplicant 300 is connected is not authenticated at this point, the access is blocked. However, Supplicant 300 is still enabled to access an Authenticator (802.1x switch 304).

In accordance with one embodiment, an encapsulation form of EAP (EAPOL) is used for all communication between the Supplicant PAE of Supplicant 300 and the Authenticator PAE of 802.1x switch 304. At present, EAPOL encapsulations are described for 802.3/Ethernet MACs and Token Ring/FDDI MACs. The EAPOL encapsulation used with 802.3/Ethernet MACs can be applied to other LAN technologies that share the same basic frame format as Ethernet (for example, IEEE Std 802.12 Demand Priority operating in IEEE Std 802.3 compatibility mode). Similarly, the EAP encapsulation used with Token Ring/FDDI MACs can be applied to other LAN technologies that share the same basic frame format as IEEE Std 802.5 Token Ring (for example, FDDI or IEEE Std 802.12 Demand Priority operating in IEEE Std 802.5 compatibility mode). Further details of EAPOL frames, PDU (physical data unit) fields and parameter definitions, addressing, and other related topics are contained in Section 7 of IEEE Std. 802.1x-2001.

In response to receiving data via EAPOL, the Authenticator PAE can then repackage the EAP protocol for onward transmission to the Authentication Server, if the server function is not co-located. Repackaging is necessary when the protocol employed for accessing the Authentication Server is different than EAPOL. For example, RADIUS offers one suitable means of providing this latter aspect of communication; however, this may be achieved by the use of other protocols, as well. The dashed lines on the right-hand side of FIG. 3 indicate the protocol used for communications between the 802.1x switch and the RADIUS server is different than the EAPOL protocol used between the Supplicant and the switch.

Returning to FIG. 3, Supplicant 300 initiates an authentication by sending an EAPOL-Start frame 314 to 802.1x switch 304. In response to receiving the start frame, the 802.1x switch sends back an EAP Identity Request. 316. Supplicant 300 then sends an Identity Response 318 back to the 802.1x switch 304.

At this point, the switch begins an authentication process with RADIUS server 310. First, a RADIUS access request 320 is sent from 802.1x switch 304 to RADIUS server 310. The RADIUS server responds by issuing an access challenge 322. This is repackaged into EAPOL form and forwarded to Supplicant 300 as an EAP request 324.

An access challenge (or authentication challenge) corresponds to a common technique for authenticating an unknown, non-trusted entity (in this case Supplicant 300). Rather than only permitting a predetermined authentication method, EAP allows the Authenticator PAE to request more information before determining the specific authentication mechanism. In EAP, the authenticator PAE sends one or more Requests to authenticate the Supplicant PAE. The Request has a type field to indicate what is being requested. Examples of Request types include Identity, MD5-challenge, One-Time Passwords, and Generic Token Card. The MD5-challenge type corresponds closely to the CHAP authentication protocol. Typically, the authenticator will send an initial Identity Request followed by one or more Requests for authentication information. However, an initial Identity Request is not required, and it may be bypassed in cases in which the identity is presumed. The Supplicant PAE sends a Response packet in reply to each Request. As with the request packet, the Response packet contains a type field that corresponds to the type field of the Request.

After a selected or default authentication scheme is identified, the authenticator entity issues a challenge to the non-trusted entity. The non-trusted entity must then reply with information corresponding to the challenge to prove that the entity is trustworthy.

In one embodiment, a public key technique in accordance with Transport Layer Security (TLS, RFC2716) is employed for the challenge-response operations. TLS requires the existence of some credentials on the client, such as a public-key certificate and the associated key-pair in the machine. In accordance with the discussion of the TPM above, the key-pair function is enabled in block 106. This deployment further relies on some Public Key Infrastructure (PKI) available to the authenticator and associated directory to associate client machines (i.e., Supplicants) with their key-pairs.

In response to EAP request 324, Supplicant 300 sends authentication credentials 326 to 802.1x switch 304. The switch then repackages the response and forwards the credentials to RADIUS server 310 via an Access Request 328. If authenticated via the credentials, the RADIUS server sends an Access-Accept to 802.1x switch 304, which then opens the Port to allow Supplicant 300 to access secure subnet 306. If the credentials are insufficient (i.e., the Supplicant cannot be authenticated), the Port is left blocked to the Supplicant).

In one embodiment Supplicant EAPOL operations shown on the left-hand side of flow diagram 312 are implemented via one or more supplicant SMM handlers. As discussed above, the SMM handlers may be dispatched and executed in response to an xMI event. In one embodiment, supplicant 300 is enabled to implement supplicant SMM handlers via a callable interface, which may be accessed via either firmware or software (e.g., the OS). In one embodiment, the callable interface comprises an ACPI (Advanced Configuration and Power Interface) 2.0 Fixed ACPI Description table (FACP) entry with the system port used to generate a synchronous xMI. This access facility employs an "Authenticate Port" xMI command entry. When invoking this service, the OS shall acquiesce and block its native networking driver from using the port.

With reference to FIG. 4, in another embodiment the Supplicant EAPOL operations are implemented via a Baseboard Management Controller (BMC) 400. BMCs provide out-of-band management support for computing platforms, such as computer servers. This enables management functions to be performed without requiring any OS complicity—in fact, management functions are still enabled even if the OS hangs.

Typically, BMC 400 will be mounted or otherwise communicatively coupled to a baseboard 402. Also coupled to the baseboard is a network interface controller (NIC) 404. BMC 406 has access to NIC 404 via TCO port 406. Machine-executable instructions (i.e., code) 408 comprising an algorithm for supporting the network port authentication operations discussed above may be stored in either BMC 400 or a non-volatile storage device 410.

In one embodiment, BMC 400 comprises an IPMI-compliant baseboard management controller. Accordingly, code 408 can be dispatched for execution via an IPMI message to the BMC to "request" authentication of the platform's port.

In accordance with another aspect of the invention, a "mixed" authentication scheme may be implemented, wherein firmware supports port authentication during pre-boot, while OS-runtime port authentication is provided by and 802.1x compliant operating system. This scheme is graphically illustrated in FIG. 5, wherein authentication credentials are retrieved and/or generated during pre-boot. For example, in cases in which credentials are stored in a TPM, the credentials may be retrieved from the TPM during pre-boot. The authentication credentials are then passed to the operating system upon load or in response to a port authentication request in a block 502, enabling the operating system to perform a port authentication process that employs the credentials.

Exemplary Computer System for Practicing
Embodiments of the Invention

Figure 6:
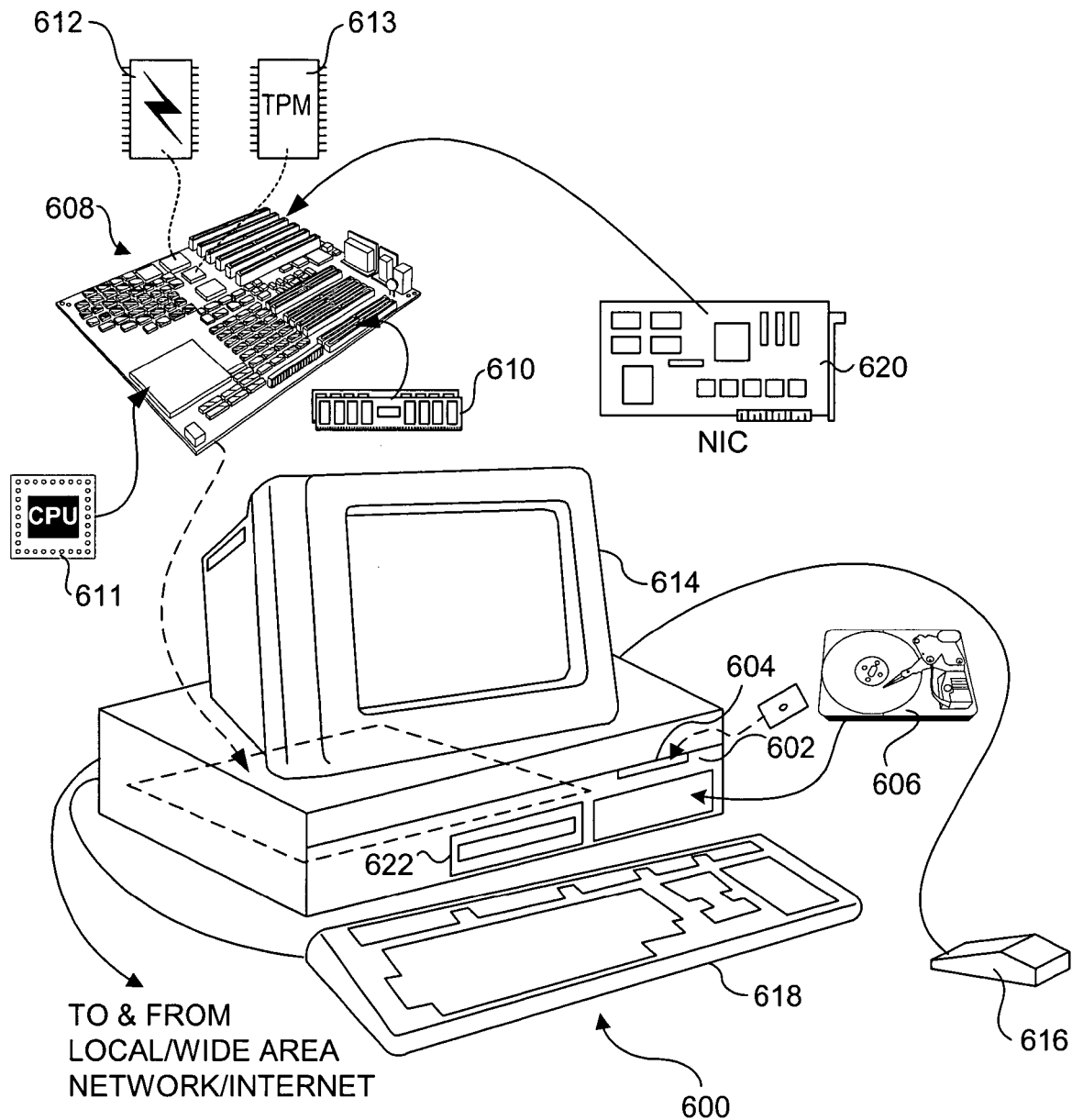
FIG. 6 is a schematic diagram illustrating a computer system for practicing embodiments of the invention.

With reference to FIG. 6, a generally conventional computer 600 is illustrated, which is suitable for use as supplicant systems, and authentication servers in connection with practicing embodiments of the invention. Examples of computers that may be suitable for supplicant systems as discussed above include PC-class systems operating the Windows NT or Windows 2000 operating systems, Sun workstations operating the UNIX-based Solaris operating system, and various computer architectures that implement LINUX operating systems. Computer 600 is also intended to encompass various server architectures, as well as computers having multiple processors.

Computer 600 includes a processor chassis 602 in which are mounted a floppy disk drive 604, a hard drive 606, a motherboard 608 populated with appropriate integrated circuits including memory 610 and one or more processors (CPUs) 611, as are generally well known to those of ordinary skill in the art. The computer also includes a boot firmware device 612 comprising a flash device in which a base portion of Firmware is stored. As discussed above, with reference to FIG. 2, firmware components, including SMM handlers, may be stored in boot firmware device 612, or may be loaded from other storage devices. In one embodiment, a TPM 613 in which authentication credentials are stored is coupled to motherboard 608. A power supply (not shown) is used to provide power to motherboard 608 and various peripheral devices discussed below. It will be understood that hard drive 606 may comprise a single unit, or multiple hard drives, and may optionally reside outside of computer 600. A monitor 614 is included for displaying graphics and text generated by software programs and program modules that are run by the computer. A mouse 616 (or other pointing device) may be connected to a serial port (or to a bus port or USB port) on the rear of processor chassis 602, and signals from mouse 616 are conveyed to the motherboard to control a cursor on the display and to select text, menu options, and graphic components displayed on monitor 614 by software programs and modules executing on the computer. In addition, a keyboard 618 is coupled to the motherboard for user entry of text and commands that affect the running of software programs executing on the computer. Computer 600 also includes a network interface card 620 or built-in network adapter for connecting the computer to a computer network, such as a local area network, wide area network, or the Internet.

Computer 600 may also optionally include a compact disk-read only memory (CD-ROM) drive 622 into which a CD-ROM disk may be inserted so that executable files and data on the disk can be read for transfer into the memory and/or into storage on hard drive 606 of computer 600. Other mass memory storage devices such as an optical recorded medium or DVD drive may be included. The machine instructions comprising the software that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

Thus, embodiments of the invention may be used as or to support machine-executable instructions executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include storage media such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
   executing firmware instructions to initialize a supplicant system into a system management mode (SMM) during a pre-boot phase;
   receiving a network boot request during the pre-boot phase to boot the supplicant system from an operating system (OS) image accessible over a network;
   executing port authentication firmware instructions during the pre-boot phase to authenticate a network port hosted by an authenticator system and coupled to the supplicant system to which the supplicant system is linked wherein the OS image to boot the supplicant system is accessible through the network port, the authentication firmware instructions to include
      1) transmitting information identifying the supplicant system to the authenticator system coupled to the supplicant system, and
      2) transmitting authentication credentials to the authenticator system to authenticate the network port coupled to the network;
   booting the OS in the supplicant system using the OS image accessible over the network in response to the network boot request;
   executing an OS operation requesting port authentication for the network port; and
   executing the port authentication firmware instructions in response to the OS operation request.

2. The method of claim 1, wherein the authentication credentials used to authenticate the network port during the pre-boot phase are retrieved from a trusted platform module.

3. The method of claim 1, wherein the firmware instructions are embodied as one or more SMM handlers.

4. The method of claim 3, further comprising:
   asserting one of an SMI (system management interrupt) or PMI (Processor Management Interrupt) on a processor of the supplicant on a periodic basis;
   dispatching said one or more SMM handlers to handle the SMI or PMI event via operations including,
      determining if a network port needs to be authenticated; and, in response thereto,
      authenticating the network port.

5. The method of claim 1, wherein port authentication is performed using the EAPOL (extensible authentication protocol over local area network) protocol.

6. The method of claim 1, wherein the port is authenticated using an access/challenge scheme.

7. The method of claim 6, wherein the access/challenge scheme employs a Transport Layer Security (TLS) challenge response in which authentication is determined based on credentials provided by the supplicant system.

8. The method of claim 7, wherein the TLS challenge response employs credentials stored in a Trusted Platform Module (TPM), and wherein the method further comprises retrieving the credentials from the TPM.

9. The method of claim 1, wherein a determination of whether a port is authenticated is made by an authentication server that is linked in communication with the authenticator system 10. The method of claim 1, further comprising providing a callable interface via which a port authentication process can be invoked.

11. A machine-readable storage medium to store firmware instructions, which when executed by a processor perform operations including:
   executing firmware instructions to initialize a supplicant system into a system management mode (SMM) during a pre-boot phase;
   receiving a network boot request during the pre-boot phase to boot the supplicant system from an operating system (OS) image accessible over a network;
   executing port authentication firmware instructions during the pre-boot phase to authenticate a network port hosted by an authenticator system and coupled to the supplicant system to which the supplicant system is linked wherein the OS image to boot the supplicant system is accessible through the network port, the authentication firmware instructions to include
      1) transmitting information identifying the supplicant system to the authenticator system coupled to the supplicant system, and
      2) transmitting authentication credentials to the authenticator system to authenticate the network port coupled to the network;
   booting the OS in the supplicant system using the OS image accessible over the network in response to the network boot request;
   executing an OS operation requesting port authentication for the network port; and
   executing the port authentication firmware instructions in response to the OS operation request.

12. The machine-readable storage medium of claim 11, wherein the firmware instructions are embodied as one or more SMM handlers.

13. The machine-readable storage medium of claim 11, to store firmware instructions, which when executed by a processor perform operations further including:
  asserting one of an SMI (system management interrupt) or PMI (Processor Management Interrupt) on a processor of the supplicant on a periodic basis;
  dispatching said one or more SMM handlers to handle the SMI or PMI event via operations including,
    determining if a network port needs to be authenticated; and, in response thereto,
    authenticating the network port.

14. The machine-readable storage medium of claim 11, wherein port authentication is performed using the EAPOL (extensible authentication protocol over local area network) protocol.

15. The machine-readable storage medium of claim 11, wherein the port is authenticated using an access/challenge scheme.

16. The machine-readable storage medium of claim 11, wherein a determination of whether a port is authenticated is made by an authentication server that is linked in communication with the authenticator system.

* * * * *